United States Patent [19]

Brown, Jr. et al.

[11] 4,162,336

[45] Jul. 24, 1979

[54] MONOSACCHARIDE-CONTAINING DRY PET FOOD HAVING YIELDABLE ELASTIC STRUCTURE

[75] Inventors: Arthur V. Brown, Jr., Bessemer; Richard J. Karrasch, Sterrett, both of Ala.

[73] Assignee: The Jim Dandy Company, Birmingham, Ala.

[21] Appl. No.: 853,540

[22] Filed: Nov. 21, 1977

[51] Int. Cl.² ............................................. A23L 1/09
[52] U.S. Cl. .................................. 426/623; 426/448; 426/449; 426/630; 426/635; 426/656; 426/658; 426/805
[58] Field of Search ............... 426/623, 549, 805, 630, 426/658, 656, 635, 447, 618, 622, 625, 802, 448, 449

[56] References Cited

U.S. PATENT DOCUMENTS

| | | | |
|---|---|---|---|
| 3,202,514 | 8/1965 | Burgess et al. | 426/805 X |
| 3,759,714 | 9/1973 | Burkwall | 426/805 |
| 3,765,902 | 10/1973 | Charter | 426/805 |
| 3,873,736 | 3/1975 | Palmer et al. | 426/802 X |
| 3,959,511 | 5/1976 | Balaz et al. | 426/549 |
| 3,962,462 | 6/1976 | Burkwall et al. | 426/805 X |
| 4,006,266 | 2/1977 | Bone et al. | 426/623 |
| 4,020,187 | 4/1977 | McCulloch et al. | 426/623 X |

OTHER PUBLICATIONS

Rose et al., "The Condensed Chemical Dictionary", Van Nostrand Reinhold Co., 1970, pp. 506-507.

*Primary Examiner*—R. B. Penland

[57] ABSTRACT

Inclusion of 7½% to 15% of a monosaccharide in a dry animal food prepared by hot extrusion of a mixture comprising at least 50% by weight cereal meal and 15%-35% by weight protein yields a product having a partially elastic, partially deformable, chewy, non-crumbly structure. Unlike soft pet foods of substantially higher water content, the present product requires no polyhydrins either as a texturizer or as a preservative.

Under the process described the product, when extruded, has a water content of approximately 20% and is dried to about 15% without loss of its unique texture and with minimal energy costs.

4 Claims, 3 Drawing Figures

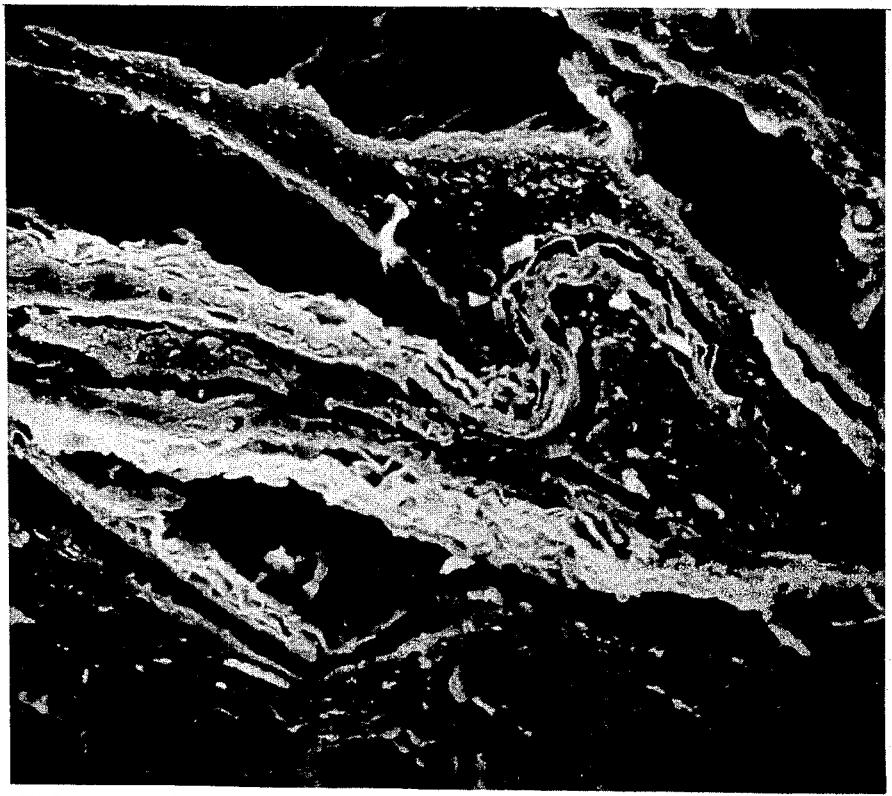
FIG.1-INVERT

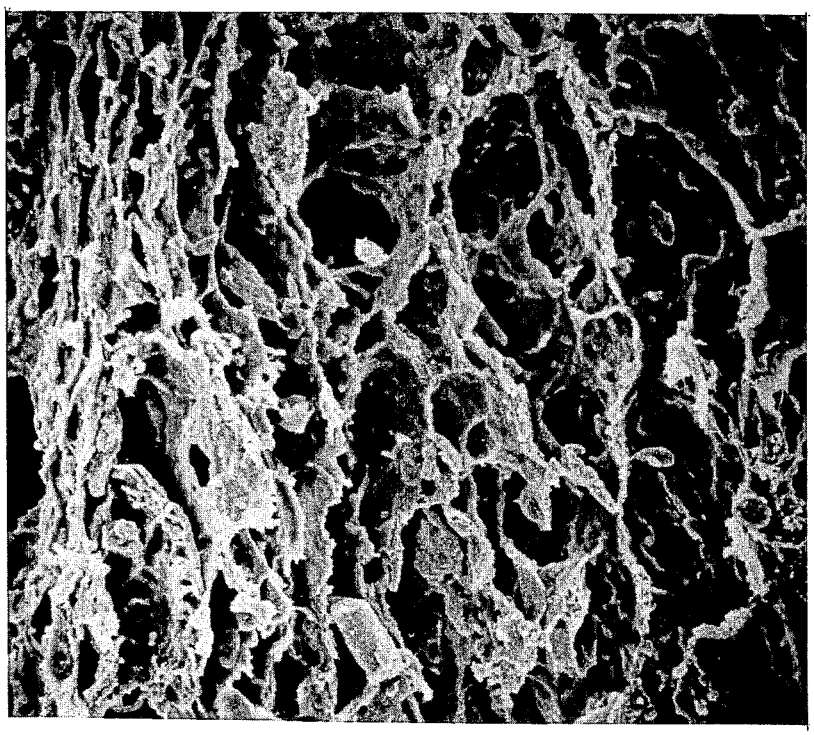
FIG. 2 — SUCROSE
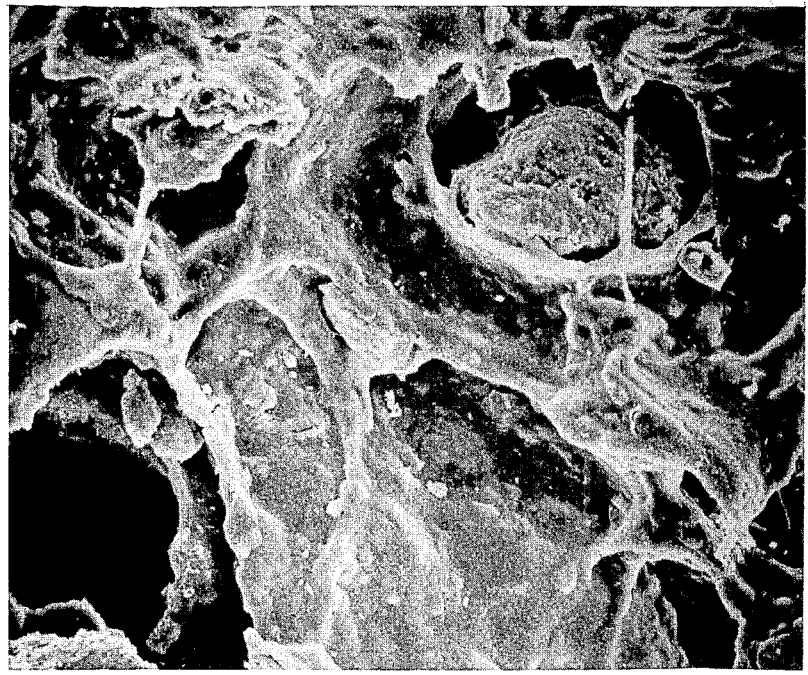
FIG. 3 — CORN

MONOSACCHARIDE-CONTAINING DRY PET FOOD HAVING YIELDABLE ELASTIC STRUCTURE

BACKGROUND OF THE INVENTION

Pet foods are recognized as being divided into three basic types, as set forth in U.S. Pat. No. 4,039,689. The first type comprises those pet foods having moisture content greater than 50% by weight; these require aseptic canning. The second type, considered semi-moist, contains from about 15% to about 50% by weight of moisture; and is conventionally packaged in polyethylene or other air-tight packages; and in this class, carbohydrates, principally sugar and polyhydrins, are used for bacteriostasis, these requiring the use of a great deal of meat protein for nutritional balance. Considerations governing this type of pet food are set forth in U.S. Pat. No. 3,202,514. The third type, which contains up to about 15% moisture, conventionally consists primarily of cereal; because of their low moisture content, they are stable and require no bacteriostatic ingredients; but polyhydrins have been utilized because they relieve the hardness which has heretofore been characteristic of this dry pet food classification.

Simple sugars have this bacteriostatic property, like sucrose. In compounding moist pet foods utilizing sucrose, this addition has been suggested to inhibit rigid crystallization as pointed out in said U.S. Pat. No. 3,202,514.

SUMMARY OF THE INVENTION

We have discovered that the utilization of monosaccharides in pet foods of the dry category, that is, where moisture content does not exceed 15%, will result in a product having a unique, soft, yieldingly elastic structure, when made by the process as hereafter more fully described. The product of the invention includes at least 50% by weight of cereal meal, between 15% and 35% by weight of protein, moisture content of 10% to 15%, and between 10% and 15% of a monosaccharide. The food product so constituted, despite its dryness, is not brittle or crumbly, but is characterized by a yielding, compressive elasticity which continues despite plastic deformation. These characteristics render the product especially "chewy". In the process of the present invention, which is a hot extrusion process, the ingredients, including a monosaccharide, are mixed with water at a temperature below the boiling point and introduced into the barrel of an extruder. Enough pressure is applied in the extruder barrel, without any added steam, to cause the monosaccharide solution to permeate and cook the ingredients and bring them to a temperature above the boiling point. On extrusion, a portion of the moisture is flashed off, and the remaining ingredients are puffed, to leave a hot product of substantially 20% moisture content. Drying to a moisture content preferably substantially 15% by weight is carried out during progressive cooling without reheating the product. Wholly apart from the saving of energy resulting from nonuse of steam for mixing the ingredients, the use of mechanical shear rather than added heat in the extruder barrel, and minimal use of heat energy for drying, final drying by ambient air flow affords and preserves the unique texture of the new product.

BRIEF DESCRIPTION OF THE DRAWINGS

FIG. 1 is a photograph, enlarged 1.5 times, of the resolution of a surface of the present product, made with substantially 100% invert sugar, provided by a scanning electronmicrograph at 200 magnifications.

FIG. 2 is a similarly enlarged photograph made from a scanning electronmicrograph, at similar resolution, of a control specimen similarly made except for the substitution of sucrose for invert sugar.

FIG. 3 is a similarly enlarged photograph made from a scanning electronmicrograph, at similar resolution, of a control specimen similarly made except for the substitution of corn meal for invert sugar.

DESCRIPTION OF THE PREFERRED EMBODIMENT

The animal food of the present invention utilizes a basic dry food formula. In conventional dry foods, such formulae typically comprise a mixture of various cereal meals, a lesser portion of meat and bone meal or fresh meat byproducts, an enriched vitamin source, minerals, animal fat and emulsifiers, and a protein-binding material such as casein or coagulated gluten. Since the moisture content in such dry foods is only about 10%–15% by weight, compounds which reduce water activity to bacteriostatic levels, such as sugars and polyhydrins, are not required. These are energy rich as well as expensive and tend to cause a nutritional imbalance by contributing an excess of calories relative to protein content; thus, the soft moist animal foods which typically contain 15%–35% sugar or sugar equivalent, such as polyhydrins, must compensate for the increased calories by omitting a substantial portion of the cereal carbohydrate and substituting meat products or a protein-enriched vegetable meal such as soybean flours and meals therefor.

The animal food of the present invention typically contains greater than 50% of vegetable meal comprising ground wheat, yellow corn, and soybean meal. In the preferred embodiment, ground wheat and yellow corn are the predominant ingredients and range from about 45%–60% by weight of the final product. Ground cereal grains derived from corn, oats, wheat, milo, barley, grain by-products and mixtures thereof are similarly suitable for use in the present product provided that the total of such ingredients is about 45%–60% by weight. The relatively high carbohydrate content of such vegetable meals is balanced preferably by the addition of between 10% and 25% by weight of meat and bone meal or meat byproducts, in addition to a small amount (about 5%–10% by weight) of soybean meal and a 60% gluten meal (0%–15% by weight) produced by acid coagulation. Fish meal, dried blood, and the fleshy byproducts of a variety of domestic animals may also be suitable. Fat, vitamins, minerals, mold inhibitors, and other conventional ingredients are usually included, as shown in the examples which follow.

In the present product, it is significant that the so-called plasticizers comprising propylene glycol, glycerol, or other higher polyhydric alcohols are not required for either bacteriostasis or texturizing. Furthermore, the use of large amounts of protein binders or adhesives, heretofore taught to impart a stringy, fibrous texture and appearance to dry dog foods (as described in U.S. Pat. No. 3,959,511), is to be strictly avoided, inasmuch as the compressive elasticity of the present product is associated with a substantially nonfibrous matrix, as hereafter described.

The crucial ingredient in the present cereal-based formulation is a monosaccharide about 7½%–15% by weight. The monosaccharide may be an aldohexose or ketohexose but not a disaccharide or any higher polysaccharide or dextrin. Preferably the monosaccharide is a mixture of glucose and fructose derived from a substantially 100% inversion of sucrose. The presence of some disaccharide or higher sugar does not appear to completely destroy the unique, softly elastic texture of the present product, as hereafter described; but the substitution of 60% inverted sucrose up to pure sucrose produces a product of extremely hard, brittle texture, unless substantial amounts of polyhydrins are added. The products are generally indistinguishable texturally from the conventional friable, hard product obtained when no sugar is present.

The ability of the monosaccharide to effect the present softly elastic and resilient texture in the complete absence of sucrose indicates that it serves a different function than in the prior art semi-moist products. In these, where a substantial amount of sucrose was used, simple sugars have been added simply to inhibit crystallization of the sucrose.

The molecular basis of the present surprisingly elastic texture is not now understood and Applicants do not wish to be bound to any particular theory. The monosaccharide ingredient, however, does not here function merely as a humectant in retaining intrinsic water content.

The pH of the present composition does not appear to substantially affect the present texture, and so alter the interaction of the monosaccharide with the macromolecular components. The preferred pH range is 4.5 to 5.2. A pH adjustment is obtained by addition of from 0.1 to 1% of an edible acid such as phosphoric acid. The lowered pH, along with the relatively low moisture content, achieves bacteriostasis; even (as indicated by preliminary tests) at water activity values higher than conventional teachings would consider safe. (e.g. U.S. Pat. No. 3,873,736 to Palmer)

In the process of the present invention the hot extrusion is carefully controlled to yield the product of exceptional structure described. In this process, the food ingredients mentioned, the largest of which by weight is cereal meal, are mixed with water at a temperature below boiling point and with a monosaccharide which enters into the solution in the water. The mixed ingredients are introduced into the barrel of a conventional extruder, adjusted to apply enough pressure in the extruder barrel to cause the solution of the simple sugar and water to permeate the meal ingredients, and without addition of steam but merely by mechanical work and pressure, to raise the moisture to a temperature above the boiling point. The product is then emitted from the orifice of the extruder, at a temperature over the boiling point, about 240° F., flashing off a portion of the moisture to obtain a puffed product whose moisture content is substantially 20%. On exiting from the extruding orifice, the emitted product is chopped into short segments about one-half inch in length. The hot segments are driven to a dryer and as they progressively cool, they are dried to a moisture content of substantially 15% by weight or less, but not below 10%. Drying may be by ambient air or with minimal heat under controlled humidity as is conventional in avoiding "case hardening" of macaroni products. It is important that the cooling be progressive, that is, without reheating the product.

It is known in the art that the presence of sucrose in the cook tends to confer a lubricating effect. We have found that the simple sugar has a similar effect; thus, the composition in the cook of the meal components relative to moisture must be higher than in a corresponding product made without sugar. The heavier bulk is here used to advantage; it produces sufficient restriction in the extruder barrel to provide the elevated pressures and temperatures required for optimal extrusion. In addition, the extruder may be conventionally modified to provide further restrictions following after the extruder orifice. In the examples set forth hereinbelow, the machine settings and other process steps were identical for all three samples, the dramatic difference in structure of the final product between the sucrose and invert sugar-containing samples arising only from the presence of a monosaccharide.

Examination of specimens from all three samples by light microscopy after carbohydrate- and protein-specific staining demonstrated that in all samples there was a uniform distribution of the carbohydrate and protein ingredients. This examination requires the conclusions that the mechanical working in the extruder barrel brought about uniform distribution and intimate association of the ingredients, and that the differences in structure, evident from the scanning electronmicroscopy discussed hereafter, were due principally to their chemical interaction with the monosaccharide.

This process has the following advantages: by introducing water below the boiling point, instead of steam, in the heavy bulk mixture, much energy is saved; and there is another large energy-saving in drying to 20% moisture content merely by expansion at the orifice, and thereafter in drying to 15% moisture by merely delivering ambient air to the product instead of heated air. Such low-temperature drying is here found to be absolutely necessary to preserve the softly elastic texture of the product.

EXAMPLE I

Table I lists the components of a typical formulation of the present invention. Cereal components comprise approximately 53% of the mixture excluding the corn gluten meal. Protein content is approximately 21%–23%. The vitamin and mineral component provides the conventional vitamin requirements for dogs, in which the brewer's yeast is a convenient source of vitamins of the B series. Sorbic acid is added as a suitable mold inhibitor. In the liquid mix, the 15% substantially 100% inverted sugar represents the addition of 15% by weight of an 80% syrup, so that the final proportion of invert sugar is about 12%.

Table I

|  | % by weight |
|---|---|
| Dry Ingredient Mix | |
| Ground wheat | 33.40 |
| Ground yellow corn | 14.95 |
| 48% meat scraps | 11.15 |
| 44% soybean meal | 5.60 |
| 60% corn gluten meal (acid coagulated) | 17.55 |
| Vitamin & Mineral Mix | |
| Brewer's yeast | .54 |
| Dog mineral mix | .29 |
| Dog vitamin mix | .11 |
| Sorbic acid | .16 |
| Potassium sorbate | .11 |

Table I-continued

| | % by weight |
|---|---|
| Whey type-K | .54 |
| Liquid Mix | |
| Phosphoric acid | 0.60 |
| Fat-animal | 1.00 |
| 100% inverted sugar | 15.00 |

The dry mix was weighed out and put into a mixer. The vitamin and mineral mix was then added and allowed to mix for several minutes before the syrup containing the invert sugar, phosphoric acid, and fat were added. Overall moisture was adjusted to provide about 20% by weight of the final formulation.

Extrusion was carried out on a Wenger X-20 extruder, at a feeder screw rate of 17 rpm. The temperature maintained in the heads along the extruder barrel were 98° F., 140° F., 160° F., 95° F., 95° F. and 90° F. respectively to provide temperature control and prevent over cooking. The density of the product was approximately 22 lbs./cu. ft.

EXAMPLE II

EXAMPLE II is a control formulation substituting 15% of an 80% sucrose syrup for the invert sugar of EXAMPLE II. Table II indicates that the other components were identical to the formula of EXAMPLE I. Extrusion was carried out on the Wenger X-20 extruder under identical conditions to EXAMPLE I.

Table II

| | % by weight |
|---|---|
| Dry Mix Ingredients | |
| Ground wheat | 33.40 |
| Ground yellow corn | 14.95 |
| 48% meat scraps | 11.15 |
| 44% soybean meal | 5.60 |
| 60% gluten meal | 12.55 |
| Vitamin & Mineral Mix | |
| Brewer's yeast | 0.54 |
| Dog mineral mix | .29 |
| Dog vitamin mix | .11 |
| Sorbic acid | .16 |
| Potassium sorbate | .11 |
| Whey type-K | .54 |
| Liquid Mix | |
| Phosphoric acid | 0.60 |
| Animal fat | 1.00 |
| Sucrose syrup | 15.00 |

EXAMPLE III

In this example, 15% by weight of a solution containing suspended corn meal was added instead of either invert sugar or sucrose. This example thereby provides a control product of a formulation identical to EXAMPLES I and II containing no sugars whatever. Again, the extrusion was carried out on the Wenger X-20 extruder under identical conditions to EXAMPLES I and II.

Table III

| | % by weight |
|---|---|
| Dry Mix Ingredients | |
| Ground wheat | 33.40 |
| Ground yellow corn | 14.95 |
| 48% meat scraps | 11.15 |
| 44% soybean meal | 5.60 |
| 60% corn gluten meal (acid coagulated) | 12.55 |

Table III-continued

| | % by weight |
|---|---|
| Vitamin & Mineral Mix | |
| Brewer's yeast | 0.54 |
| Dog mineral mix | 0.29 |
| Dog vitamin mix | 0.11 |
| Sorbic acid | 0.16 |
| Potassium sorbate | 0.11 |
| Whey type-K | 0.54 |
| Liquid Mix | |
| Phosphoric acid | .60 |
| Animal fat | 1.00 |
| Ground yellow corn | 15.00 |

Comparative electronmicrographic studies of sucrose and monosaccharide-containing products, otherwise identical in composition, show dramatic reproduceable differences in structure between the two products, as hereinafter more fully described.

To better understand the unique texture of the present invention, a statistically significant number of representative samples were examined by scanning electronmicroscopy, which provides high resolution visualization for examining the three-dimensional surface laid open. The samples were prepared by the critical point drying method described by Narconis, Proc. of the 8th Annual Scanning Electron Microscope Symposium, April, 1975. The procedure is generally as follows: samples were fixed in 4% glutaraldehyde in 1M phosphate buffer, followed by rinsing in buffer and progressive dehydration in a series of acetone solutions of increasing acetone proportion, ending with 100% acetone. In the critical point drying step, the acetone is replaced with low temperature carbon dioxide; at 1600 psi the gas/liquid interface disappears and the sample is allowed to dry. The dried samples are then mounted on metal stubs with silver glue and coated with a 100 angstrom thick coating of gold/platinum under vacuum. The critical point drying procedure minimizes ultrastructural distortion and microscopic artifacts typically seen with conventional air-drying. The samples thus prepared were scanned and photographed in the JEOL 35 Scanning Electron Microscope at magnifications of 10 to 2,000 diameters.

FIG. 1 shows an electronmicrograph of a cross-section of the product of the present invention as prepared in example 1. The sample was cut and treated according to the critical point drying method described hereinabove. At a magnification of 200X, the product is typically characterized in being made up, in its greater part, of convoluted layers; and in its lesser part by inclusions in fissure-like spaces of elongated chamber-like cells whose width in cross-section is about 20 to 200 microns. In FIG. 1, the convoluted, layered portions appear as relatively electron-dense bodies containing the 5 to 15 micron thick lamina. At the edges of these bodies, the lamina have been pulled apart somewhat by the cutting procedure, indicating their laminar organization. The fissure-like spaces and their inclusions appear to provide natural fracture lines for the product and breakage under compression appears to occur along these lines. Direct examination of the fissure surfaces by electronmicroscopy (not shown) reveals a spongy, porous structure of discrete chamber-like cells.

A comparative electronmicrograph of a similarly constituted specimen, dried by reheating, showed coalescence of the laminae and some constriction of the convoluted layers. This specimen was hard and unyielding, demonstrating the importance of drying without reheating.

FIG. 2 shows an electronmicrograph at 200X of the control product of EXAMPLE II, otherwise identical to the formula of EXAMPLE I, except for using sucrose instead of the monosaccharide. The structure of this product appears as webs of chamber-like cells, most of which are about 40 to 200 microns in diameter and having somewhat fibrous walls. This structure occurs substantially uniformly throughout the product regardless of whether it is examined at a line of cross-section or at a crumbled surface.

In the product shown in FIG. 3, no sugar of any kind is present; in this control corn is substituted therefor as in the formula of example 3. At a magnification of 200X, the product appears to be comprised of chamber-like cells morphologically identical to but slightly larger than those of EXAMPLE II (sucrose). Similarly, this structure is substantially uniform throughout the product.

We hypothesize, without limitation, that this chamber-like cell structure, seen in both the sucrose-containing and corn-containing controls, confers rigidity to the product at low moisture content, thereby yielding the hard, friable texture noted in the micrometer compressibility test. In contrast, the relatively dense, convoluted, layered structure of the present product, interspersed with the fissures containing chamber-like cells, is associated with the springy, compressible texture of the present product.

The structure of the present product was further studied by high magnification transmission electronmicroscopy and compared with the sucrose-containing control of EXAMPLE II. The procedure for preparing samples is as follows: samples were fixed in 4% glutaraldehyde-phosphate buffer, further fixed in 2% osmiun tetroxide, and dehydrated progressively in a series of ethanol solutions of increasing ethanol proportion, ending with 95% ethanol. This solution was changed to 100% propylene oxide and finally placed in a one-to-one mixture of propylene and epoxy resin. Following evaporation of the propylene, the sample thus treated was embedded in pure epoxy resin and polymerized overnight at 60° C. The samples were then sectioned to a thickness of approximately 0.1 microns on an LKB-Huxley ultra-microtome. The sections were stained in lead citrate/uranyl acetate and examined in a Phillips 300 Transmission Electron Microscope. At 25,000X both the invert sugar product of example 1 and the sucrose-containing product of EXAMPLE II appeared to be predominantly vacuolar in structure with electron-dense matter interconnecting these vacuoles and forming the surface of the walls thereof.

However, at 75,000X, the limit of visual resolution, marked differences in structure were made evident. The intervacuolar matter of the present monosaccharide-containing product, EXAMPLE I, shows no organized structure, suggesting that the layer-like convolutions observed by scanning electronmicroscopy are comprised of large regions of random coiled molecules. In contrast, the sucrose-containing product of EXAMPLE II appears, at 75,000X, as a great multiplicity of fine hair-like filaments, suggesting that the fibrous wall structure observed under scanning electronmicroscopy is itself composed of smaller fiber-like bundles of molecules in microfilaments. Applicants, however, are not presently able to interpret this difference in terms of the elastic texture of the present product.

These studies suggest that the monosaccharide may interact molecularly with the starch and/or protein components of the present composition. We theorize, but without limitation, the following: (a) that the monosaccharide so interacts with the partially charged moieties of the present composition that substantial secondary bonding and electrostatic interaction between carbohydrates and/or protein molecules is altered or prevented; and (b) syneresis, arising from such secondary interactions between starch molecules and known to confer a rigidity to starch-based matrices, is thereby prevented or substantially lessened.

Two types of mechanical tests were made, comparing the properties exhibited by the present product with the sucrose and corn controls.

I. Repetitive Partly Relieved Compressive Deflections

No conventional mechanical test demonstrates desirable chewiness. This characteristic may be approximated however by demonstrating that a product deflects and deforms under each repeated compressive force, but demonstrates a partial elastic recovery between them.

To test the present product against controls, the following procedure was used: pellets in the general range of one-half inch in thickness were placed between the anvil and spindle of the micrometer caliper. The caliper was brought snug to hold the pellet firmly. Thereafter, cycles of deflection were applied and relieved as follows: on application, 0.010" followed by a partial reversal of 0.005". On such repeated deflections, the micrometer caliper effectively chewed its way through the pellets. A pellet was to be adjudged relatively chewy by the number of cycles of repeated force applications and relief up to the point it fell from the caliper, either (a) by crumbling under deflection, or (b) by failure to restore elastically sufficiently to remain in the caliper when the deflection was so partially relieved.

Specimens 4 (EXAMPLE I) comprised a basic cereal-based pet food as here disclosed which contains approximately 12% by weight invert sugar. Specimens 2 (EXAMPLE II) utilized the same formula, except sucrose 12% by weight is substituted for the invert sugar. Specimens 1 (EXAMPLE III) contained the same proportions of ingredients but ground corn meal was substituted for the sugars.

Table IV

| CODE | | % $H_2O$ | Original Thickness (inches) | Cycles to Fall Out | Deflection Sustained (inches) |
|---|---|---|---|---|---|
| 4B | (Invert) | 10.8 | 0.475" | 80 | 0.400 |
| 4B | | | 0.475 | 44 | 0.220 |
| 4B | | | 0.490 | 38 | 0.190 |
| 4B | | | 0.517 | 88 | 0.440 |
| 4B | | | 0.477 | 40 | 0.200 |
| 4B | | | 0.504 | 56 | 0.280 |
| 2B | (Sucrose) | 10.6 | 0.466" | 11 | 0.055 |
| 2B | | | 0.480 | 14 | 0.070 |
| 2B | | | 0.583 | 13 | 0.065 |
| 2B | | | 0.523 | 13 | 0.065 |
| 2B | | | 0.575 | 15 | 0.075 |
| 1B | (Corn) | 10.6 | 0.460" | 10 | 0.056 |
| 1B | | | 0.432 | 6 | 0.030 |
| 1B | | | 0.455 | 9 | 0.045 |
| 1B | | | 0.443 | 11 | 0.065 |
| 4A | (Invert) | 15.4 | 0.510" | 90* | 0.450 |
| 4A | | | 0.500 | 90* | 0.450 |
| 4A | | | 0.500 | 90* | 0.450 |
| 2A | (Sucrose) | 15.0 | 0.450" | 79 | 0.395 |
| 2A | | | 0.455 | 56 | 0.280 |
| 2A | | | 0.475 | 83 | 0.415 |

Table IV-continued

| CODE | % H₂O | Original Thickness (inches) | Cycles to Fall Out | Deflection Sustained (inches) |
|---|---|---|---|---|
| 1A (Corn) | 15.6 | 0.425" | 79 | 0.395 |
| 1A | | 0.463 | 70 | 0.350 |
| 1A | | 0.480 | 79 | 0.395 |

*Discontinued without falling out

The controls could withstand a substantial number of cycles of deflections and partial relief only at the higher moisture content level. At 10.6% moisture they crumbled after only a few cycles; and the maximum accumulated deflections they could withstand ranged from about 10% of their original thickness for the corn specimens to 15% of original thickness for sucrose specimens. While at the higher moisture content they deformed more readily and crumbled less, they demonstrated little elastic resiliency and ultimately fell from the caliper when its deflection was partly relieved.

The present product specimens 4B, at 10.8% moisture, were both yielding and elastically resilient despite their dryness. Despite local fractures they typically withstood, with residual elastic resiliency, the cycles of deflection and partial relief to a total compressive deflection of usually at least 40% of their original thickness; and it appears that substantially all specimens will withstand compressive deflection of more than 30% of their thickness without crumbling. At 15.4% moisture content, the elastic resiliency of the present product specimens 4A was such that they would not fall from the caliper, even after the cycles of compression had reduced them by 9/10ths of their original thickness.

II. Shear Resistance and Travel to Fracture

Conventional dry dog foods fracture and crumble when incised. An Instrom universal tester #1122 was employed to measure the shear travel before fracturing of the present product and controls. The resistance in kilograms built up during such travel as the blades pressed through the specimens was measured by a Kramer shear cell and recorded on a moving chart. Table V shows the results of these tests, all specimens being at approximately 10% moisture content. The successive columns correspond to the shear travel to fracture, measured in millimeters. The figures in each row indicate the kilograms of resistance at successive 1 mm intervals as the blades passed through each sample. The figures in each row terminate when increased shear travel was attended by a drop in resistance, indicating that fracture had occurred.

Table V

| Specimens | | Shear travel to fracture (millimeters) | | | | | | | |
|---|---|---|---|---|---|---|---|---|---|
| | | 1 | 2 | 3 | 4 | 5 | 6 | 7 | 8 |
| | | Measured resistance (kilograms) | | | | | | | |
| Invert | #1 | 14 | 36 | 60 | 72 | 110 | | | |
| | #2 | 10 | 15 | 20 | 30 | 44 | 76 | 88 | |
| | #3 | 10 | 14 | 24 | 33 | | | | |
| | #4 | 3 | 12 | 22 | 28 | | | | |
| Sucrose | #5 | 30 | | | | | | | |
| (control) | #6 | 29 | 52 | | | | | | |
| | #7 | 36 | | | | | | | |
| | #8 | 8 | 21 | | | | | | |
| Corn | #9 | 5 | 21 | | | | | | |
| (control) | #10 | 6 | | | | | | | |
| | #11 | 30 | 42 | | | | | | |
| | #12 | 10 | 15 | 21 | | | | | |
| | #13 | 6 | 20 | 28 | | | | | |

At 10% moisture content, the samples of the product formulated with invert sugar withstood shear travel measured at several times as great as the controls. The measured resistance increased almost linearly with the amount of shear travel, indicating that the texture was substantially elastic prior to fracture.

Attempted similar comparative tests with the described equipment and with samples and controls at 15% moisture content were inconclusive. At such higher moisture content it appeared that the shear could slice through samples, regardless of formulation, without that sudden drop in shear resistance taken, in the 10% moisture tests as indicative of fracture.

The chewy, non-friable texture which the present product appears to bring about significantly greater preference, in dog feeding tests, over dry dog foods having conventional hardness and crumbliness.

Throughout this specification the invention has been described as applied to pet foods. In compounding such foods, it is necessary to provide balanced nutrition, for which purpose the present invention is especially well suited. Nevertheless, it applies also to foods for human consumption, for example, cereal breakfast foods; and the repeated references to animal and pet foods herein are not to be taken as excluding from the scope of the invention foods for human beings.

We claim:
1. An extruded food comprising
   50% to 60% by weight of ground cereal grains,
   15% to 35% by weight of non-adhesive protein inclusive of the protein in said cereal grains,
   7½% to 20% by weight hexose monosaccharide selected from the group consisting of aldohexoses, ketohexoses, and mixtures thereof, and
   10% to 15% by weight water,
   said food having a microstructure, as seen by scanning electronmicroscopy at 200X, comprised in its greater part by convoluted layers and in its lesser part by inclusions in fissure-like spaces of elongated chamber-like cells, and
   being compressively deformable by more than 20% of its thickness without disintegration by crumbling and without loss of substantial elastic resiliency.
2. An extruded food comprising
   50% to 60% by weight of ground cereal grains,
   15% to 35% by weight of non-adhesive protein inclusive of the protein in said cereal grains,
   7½% to 20% by weight hexose monosaccharide selected from the group consisting of aldohexoses, ketohexoses, and mixtures thereof, and
   10% to 15% by weight water,
   said food having a microstructure, as seen by scanning electronmicroscopy at 200X, comprised in its greater part by convoluted layers and in its lesser part by inclusions in fissure-like spaces of elongated chamber-like cells.
3. An extruded food comprising
   50% to 60% by weight of ground cereal grains,
   15% to 35% by weight of non-adhesive protein inclusive of the protein in said cereal grains,
   7½% to 20% by weight hexose monosaccharide selected from the group consisting of aldohexoses, ketohexoses, and mixtures thereof, and
   10% to 15% by weight water,
   said food being compressively deformable by more than 20% of its thickness without disintegration by crumbling and without loss of substantial elastic resiliency.

4. A process for making a compressibly deformable extruded food comprising the steps of forming a mixture consisting essentially of 7½% to 20% by weight of a hexose monosaccharide selected from the group consisting of aldohexoses, ketohexoses, and mixtures thereof, with 15% to 35% by weight of ground cereal grains, 15% to 35% by weight of non-adhesive protein selected from the group consisting of fish meal, fleshy animal byproducts and acid-coagulated gluten meal and water, introducing the mixture into the barrel of an extruder, applying sufficient pressure in the extruder barrel, without added steam, whereby to cook said extruded food causing it to reach a temperature above boiling point of water, extruding to flash off a portion of the moisture and to puff the remaining ingredients, whereby to produce an undried product having a moisture content of substantially 20%, and drying during continuous cooling without reheating to a moisture content of substantially 15% by weight.

* * * * *

UNITED STATES PATENT AND TRADEMARK OFFICE
CERTIFICATE OF CORRECTION

PATENT NO. : 4,162,336

DATED : July 24, 1979

INVENTOR(S) : Arthur V. Brown, Jr. and Richard J. Karrasch

It is certified that error appears in the above-identified patent and that said Letters Patent are hereby corrected as shown below:

In col. 8, Table IV, column headed "Original Thickness", eighth line from bottom, the figures "0.455" are deleted and ---0.445--- are substituted.

In col. 11, starting with end of line 6 and continuing in first portion of line 7, the words "15% to 35% by weight of" are deleted (first inclusion only).

Signed and Sealed this

Sixth Day of November 1979

[SEAL]

Attest:

RUTH C. MASON
Attesting Officer

LUTRELLE F. PARKER
Acting Commissioner of Patents and Trademarks